US005179493A

United States Patent [19]

Imanishi

[11] Patent Number: 5,179,493

[45] Date of Patent: Jan. 12, 1993

[54] MULTIPLE POWER SUPPLY SYSTEM

[75] Inventor: Kazuo Imanishi, Yokohama, Japan

[73] Assignee: Kabushiki Kaisha Toshiba, Kawasaki, Japan

[21] Appl. No.: 554,923

[22] Filed: Jul. 20, 1990

[30] Foreign Application Priority Data

Jul. 25, 1989 [JP] Japan ................................ 1-191834

[51] Int. Cl.[5] ............................................. H02H 3/20

[52] U.S. Cl. ....................................... 361/91; 361/86; 307/87

[58] Field of Search ....................... 307/85, 86, 87, 38, 307/43, 39, 71, 40, 18, 29, 26, 22; 361/56, 57, 54, 88, 91, 93, 100, 101, 111, 62, 63, 65, 67

[56] References Cited

U.S. PATENT DOCUMENTS

| | | | |
|---|---|---|---|
| 3,261,980 | 7/1966 | McCartney | 307/86 |
| 3,504,272 | 3/1970 | Kenny, II | 307/24 |
| 4,009,420 | 2/1977 | Martinez et al. | 361/88 |
| 4,466,041 | 8/1984 | Witulski | 361/93 |
| 4,761,705 | 8/1988 | Reeves | 361/93 |
| 4,803,592 | 2/1989 | Ashley | 361/79 |
| 4,896,254 | 1/1990 | Bennet | 307/39 |
| 4,996,625 | 2/1991 | Soma | 361/93 |

FOREIGN PATENT DOCUMENTS

| | | |
|---|---|---|
| 0191740A3 | 8/1986 | European Pat. Off. . |
| 61-5322 | 1/1986 | Japan . |
| 61-234412 | 10/1986 | Japan . |

*Primary Examiner*—A. D. Pellinen
*Assistant Examiner*—C. Schultz
*Attorney, Agent, or Firm*—Banner, Birch, McKie & Beckett

[57] ABSTRACT

Among a plurality of power supply circuits arranged in a power supply monolithic integrated circuit, output voltages of power supply circuits except for an external microcomputer power supply circuit are monitored by a protective circuit. When an abnormal output appears at least one of the power supply circuits, the outputs of all the power supply circuits except for the microcomputer power supply circuit are cut off.

10 Claims, 4 Drawing Sheets

MULTIPLE POWER SUPPLY SYSTEM

BACKGROUND OF THE INVENTION

1. Field of the Invention

The present invention relates to a multiple power supply system having a plurality of power supplies controlled by a microcomputer.

2. Description of the Related Art

For example, a conventional audio set comprises a plurality of independent sections, e.g., a tuner section and an amplifier section, and has independent power supplies corresponding to these sections.

On the other hand, recently, microcomputers are generally used and electronic equipment is generally systematically controlled by the microcomputers. For example, a power supply monolithic integrated circuit (a system power supply monolithic integrated circuit) is known. The power supply monolithic integrated circuit is a system power supply wherein a decoder for decoding an output signal from a microcomputer and a plurality of stabilizing power supply circuits selectively controlled by the decoder are arranged on a single chip. This system power supply may be used for an audio set.

In this circuit, one of the plurality of power supply circuits is used for a microcomputer power supply. A protective circuit (such as a current limiter) is incorporated in the circuit for detecting an abnormality when a surge voltage is applied to the system power supply or an abnormality occurs in the decoder section or one of the power supply circuits, and for cutting off a bias of the entire system power supply (that is, for controlling the decoder and each power supply circuit in an OFF state).

In the system power supply described above, when the surge voltage is applied, the protective circuit detects this surge voltage and cuts off the bias of the entire system power supply so as to be able to protect the electronic equipment controlled by the microcomputer. When output short-circuiting occurs in one of the plurality of power supply circuits, the protective circuit detects the short-circuiting and cuts off the bias of the entire system power supply so as not to damage other sections.

In the conventional system power supply described above, however, in a control operation of the protective circuit, since the microcomputer power supply is also controlled in an OFF state, an operation of the microcomputer stops and the entire electronic equipment abnormally operates. In order to reset the power supply of the entire system to return to a normal operation state after the abnormal state is canceled, it is necessary to reset the microcomputer.

As described above, in a control operation of the protective circuit, since the conventional power supply monolithic integrated circuit controls the microcomputer power supply in an OFF state, the entire electronic equipment controlled by the microcomputer abnormally operates, resulting in inconvenience.

SUMMARY OF THE INVENTION

The present invention has been made to overcome the above drawbacks, and has as its object to provide a power supply monolithic integrated circuit capable of a continuous operation of a microcomputer in a control operation when a protective circuit detects an abnormality in a circuit section except for a microcomputer power supply, and capable of a continuous operation of a section of electronic equipment controlled by the microcomputer.

A power supply monolithic integrated circuit according tô the present invention is characterized by comprising a microcomputer power supply, a decoder for decoding a signal from an external microcomputer, a plurality of power supplies selectively controlled by an output of the decoder, and a first protective circuit for detecting an abnormality in any one of the plurality of power supplies, and for controlling the plurality of power supplies to an OFF state.

In a control operation when the first protective circuit detects an abnormality in a circuit section except for the microcomputer power supply, since the microcomputer power supply is independent of the control of the first protective circuit, the microcomputer can continuously receive an electric power so as to continue the operation. Therefore, the electronic equipment controlled by the microcomputer can continue the operation except for the section associated with the power supply OFF-controlled by the first protective circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the present invention will be described in detail with reference to the accompanying drawings hereinafter.

Figure 1:
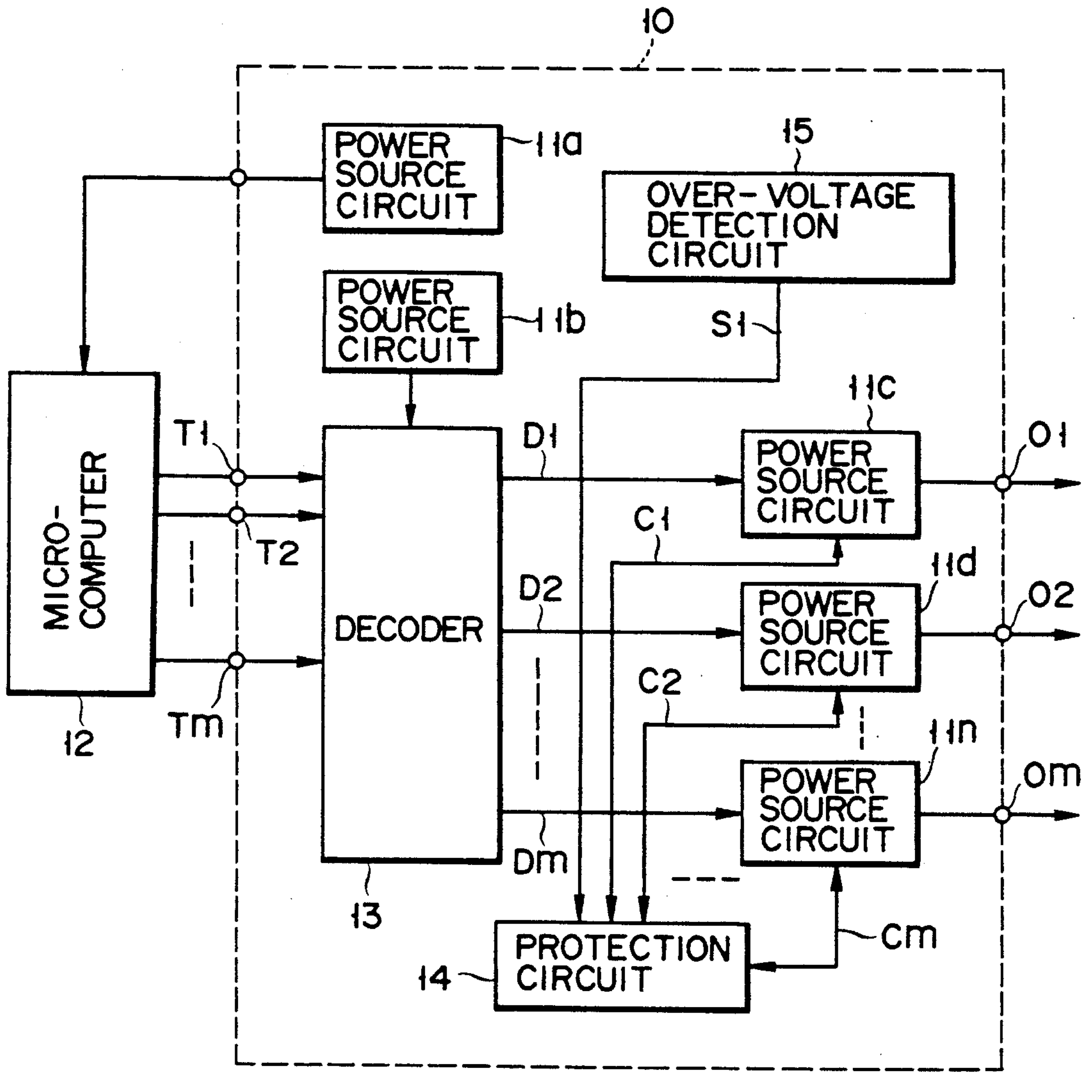
FIG. 1 is a block diagram showing an arrangement of an embodiment of the present invention.

FIG. 1 shows a system power supply for an audio set. A block 10 shown by a broken line is a power supply monolithic integrated circuit formed on a single semiconductor substrate. In the integrated circuit 10, a plurality of power supply circuits 11*a*, 11*b*, 11*c*, 11*d*, . . . , 11*n* are formed independently of each other. Among these, the power supply circuit 11*a* is used as a power supply for a microcomputer 12 arranged outside the integrated circuit 10, and the power supply circuit 11*b* is used as the power supply for a decoder 13. A plurality of bits of power supply designating outputs of the microcomputer 12 are supplied to the decoder 13 in the integrated circuit 10 through terminals T1, T2, . . . , Tm and are decoded by the decoder 13. Decode outputs D1, D2, . . . , Dm from the decoder 13 are supplied to the power supply circuits 11*c*, 11*d*, . . . , 11*n* as power supply selection signals, respectively. Output voltages from the power supply circuits 11*c*, 11*d*, . . . , 11*n* which receive the power supply selection signals are supplied from output terminals O1, O2, . . . , Om to, for example, a tuner section, an amplifier section, and a CD player section, in the audio set.

Operation state detectors which will be described later are arranged in the power supply circuits 11*c*, 11*d*, . . . , 11*n*, respectively. Detection signals from the operation state detectors are sent to a protective circuit 14 through control lines C1, C2, . . . , Cm. The control lines C1, C2, . . . , Cm include paths for transmitting protection signals from the protective circuit 14 to the power supply circuits 11*c*, 11*d*, . . . , 11*n*. An output from the power supply circuit which receives the protection signal is cut off. In this embodiment, since the detection signals from the power supply circuits 11*b*, 11*c*, . . . , 11*n* are supplied to an OR circuit in the protective circuit 14, even if an abnormal detection signal is generated by any one of the power supply circuits, an output from the OR circuit can be obtained. The output from the OR circuit is input to a protection signal output circuit in the protective circuit 14, and the protection signal is commonly output to the power supply circuits 11*c*, 11*d*, . . . , 11*n* except for the power supply circuits 11*a* and 11*b*.

In the integrated circuit 10, an overvoltage detector 15 is arranged as needed. When a surge voltage is generated by an external power supply voltage supplied to the integrated circuit 10, the overvoltage detector 15 detects the surge voltage to transmit it with detection signals of the power supply circuits 11*c*, 11*d*, . . . , 11*n* to the input side of the OR circuit in the protective circuit 14 through a line S1.

In the system power supply 10 described above, for example, when the surge voltage is applied, since the surge voltage is detected by the overvoltage detector 15 and is sent to the protective circuit 14, and all the power supply circuits 11*c*, 11*d*, . . . , 11*n* except for the for the decoder 13 and the microcomputer 12 are controlled in an OFF state at once, the audio set sections connected to the OFF-controlled power supply circuits 11*c*, 11*d*, . . . , 11*n* are protected. In addition, when an output abnormality including output short-circuiting occurs in one or a plurality of the power supply circuits 11*c*, 11*d*, . . . , 11*n* except for the power supply circuits for the microcomputer 12 and the decoder 13, the protective circuit 14 detects the abnormal output and the power supply circuits 11*c*, 11*d*, . . . , 11*n* are OFF-controlled by the protective circuit 14 so as not to adversely affect other power supply circuits of the audio set.

In such a control operation of the protective circuit 14, since the power supply circuits 11*a* and 11*b* for the microcomputer 12 and the decoder 13, respectively, are independent of the control of the protective circuit 14, the microcomputer 12 and the decoder 13 can continuously receive an electric power so as to continue their operations.

The audio set controlled by the microcomputer 12 can therefore continue the operations of its sections except for a section connected to the power supply circuit OFF-controlled by the protective circuit 14. In other words, the entire audio set never abnormally operates or stops, or it is not necessary to reset the microcomputer 12 to return to a normal operation state by resetting the power supply circuits of the entire system after an abnormal state is canceled.

Figure 2A:
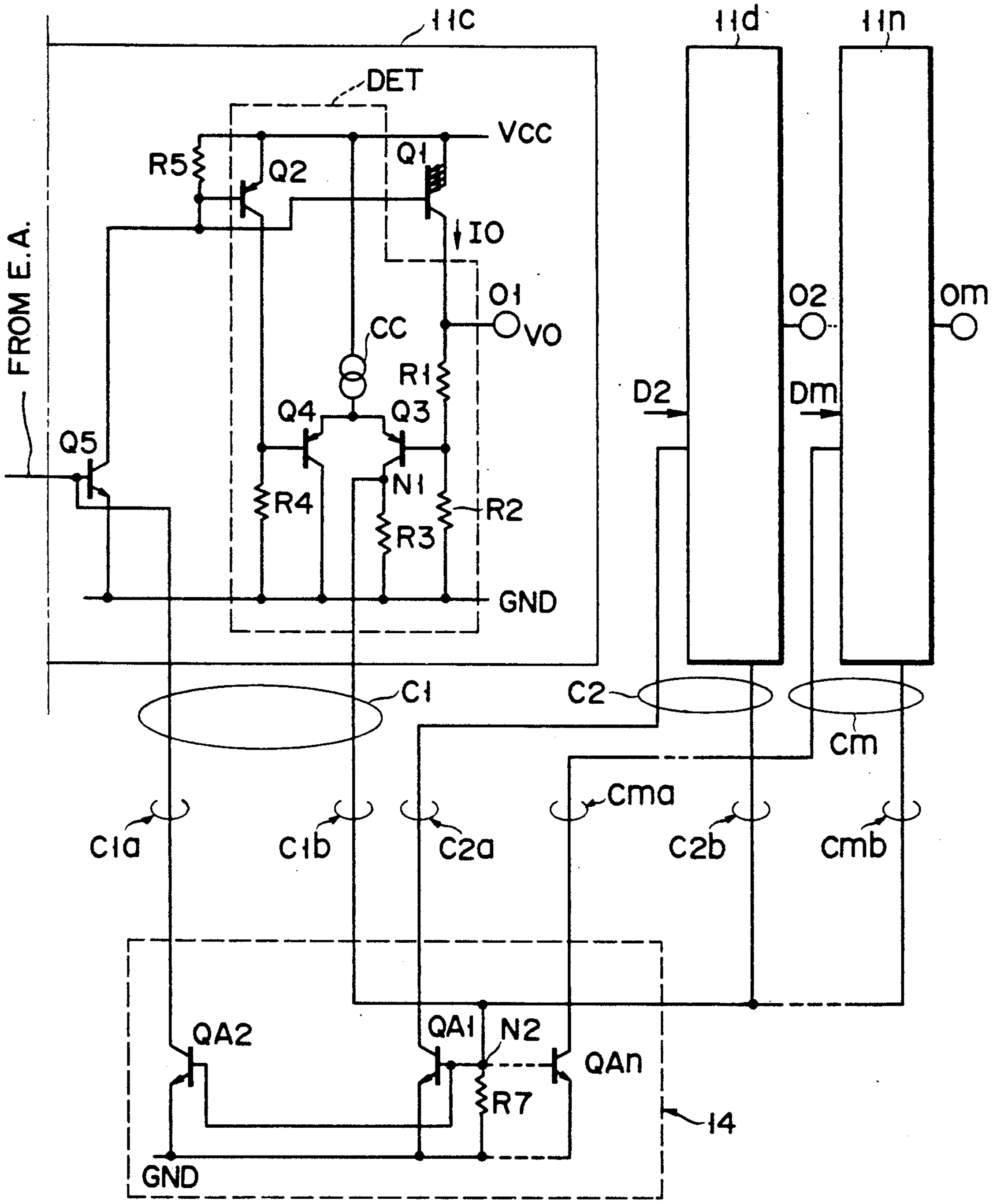
FIG. 2A is a circuit diagram showing a practical circuit arrangement of the main part of the embodiment shown in FIG. 1.
Figure 2B:
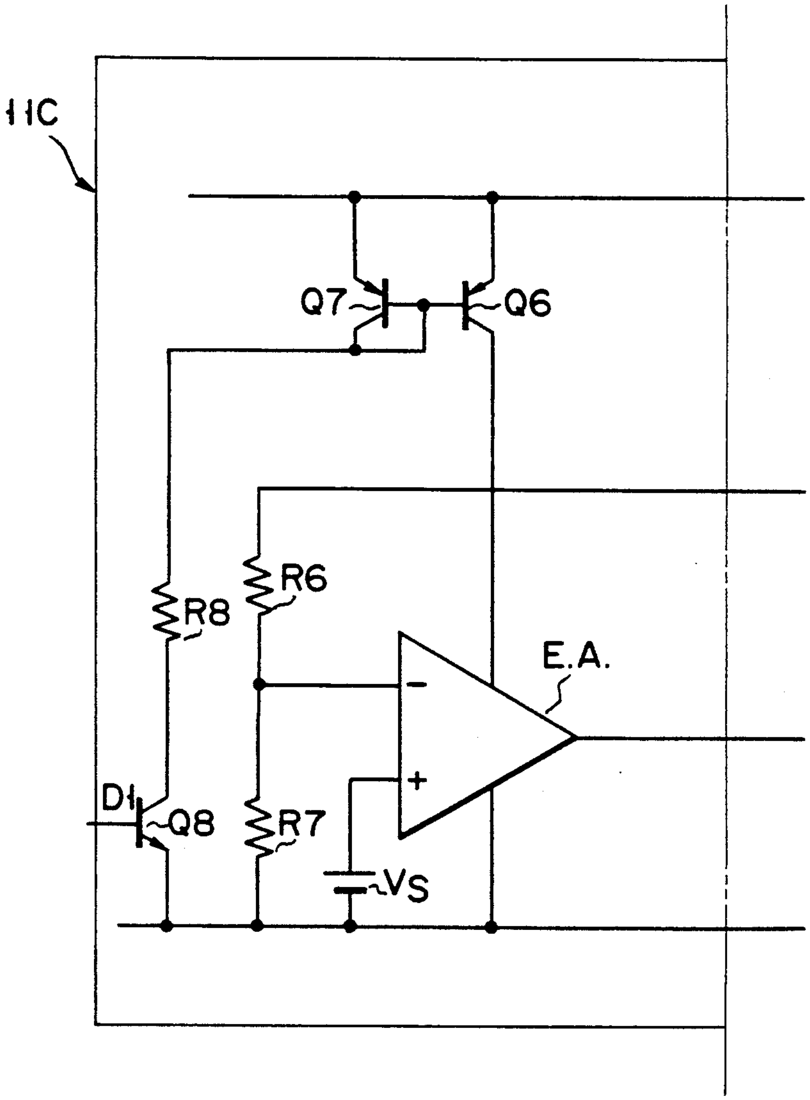
FIG. 2B shows a circuit diagram to be connected to the power supply circuit of FIG. 2A.

Practical circuit arrangements and operations of the power supply circuits 11*c*, 11*d*, . . . , 11*n* and the protective circuit 14 shown in FIG. 1 will be described in detail with reference to FIGS. 2A and 2B. In FIGS. 2A and 2B, the power supply circuit 11*c* comprises transistors Q1, Q2, Q3, Q4, Q5, Q6, Q7 and Q8 connected between a power supply line Vcc and GND. The transistors Q2 to Q4 constitute a detector DET, and the collector of the transistor Q5 is commonly connected to the bases of the transistors Q1 and Q2.

The transistor Q1 is an output transistor having a multi-emitter arrangement. The collector of the transistor Q1 is connected to an output terminal O1. The transistor Q2 forms a current mirror circuit with the transistor Q1. These transistors Q1 and Q2 are driven by the driver transistor Q5. The decode output D1 from the decoder 13 shown in FIG. 1 is supplied to the base of the transistor Q8, and the protection signal from the protective circuit 14 is supplied to the base of the transistor Q5 through a protective line C1*a* in the control line C1.

An output voltage VO is fed back to an inversion terminal of an error amplifier E.A. through two serial resistors R6 and R7. A D.C. reference voltage is supplied to a non-inversion terminal of the amplifier E.A. from a D.C. power source Vs. An output of the amplifier E.A. is supplied to the base of transistor Q5. The emitter of the transistor Q8 is grounded and the collector thereof is connected, via a resistor R8, to the collector of the transistor Q7 and the common base node of the transistors Q6 and Q7. The base of the transistor Q8 is connected to receive the decoder output D1 of the decoder 13.

In the power supply circuit 11*c*, when the transistor Q8 is turned on in response to the decoder output D1, a current mirror circuit constituted by the transistors Q6 and Q7 is driven and the error amplifier E.A. is also driven. As a result, the output of the amplifier E.A. is supplied to the base of the transistor Q5 to bring the power supply circuit 11*c* in an ON state. as follow:

$$VO = \frac{R6 + R7}{R7} \cdot Vs \quad (1)$$

The transistors Q3 and Q4 serve as a comparator driven by a constant current source CC. As an input to be a reference to the comparator, a voltage generated across a resistor R4 by a current flowing through the transistor Q2 of the current mirror circuit is used. The voltage is supplied to the base of the transistor Q4. The voltage to be compared by the comparator is an output voltage VO at the output terminal O1. The output voltage VO is detected by the resistance ratio between resistors R1 and R2, supplied to the base of the transistor Q3, and compared with the reference voltage at the base of the transistor Q4.

An output from the comparator constituted by the transistors Q3 and Q4 is extracted from a node between the collector of the transistor Q3 and a resistor R3, and commonly connected to the bases of transistors QA1, QA2, . . . , QAm in the protective circuit 14. The emitters of the transistors QA1, QA2, . . . , QAm are connected to a power supply line GND, and the bases of the transistors are connected to the power source line GND through a resistor R7. The collector of the transistor QA2 is connected to the base of the transistor Q5 through the protective line C1a.

Other power source circuits 11*d* to 11*n* are arranged in the same manner as the power source circuit 11*c*, and outputs from the detectors are commonly OR-connected to a node N2 through detection lines C2*b* to Cmb.

It is assumed that in the circuit shown in FIGS. 2A and 2B, short-circuiting occurs at a section connected to the output terminal O1 of the power supply circuit 11*c*, for example, the tuner section. As a result, the voltage VO of the output terminal O1 is abruptly decreased, so that the base voltage of the transistor Q3 is decreased with respect to the reference voltage at the base of the transistor Q4. Thus, a large current flows into the resistor R3 through the transistor Q3, a voltage of the node N1 increases, and the transistors QA1 to QAn in the protective circuit 14 are turned on. As a result, the base voltage of the transistor Q5 is decreased to be set in a cut-off state, and the output transistor Q1 is cut off. The outputs from other power supply circuits 11*d* to 11*n* are also cut off.

The detector DET shown in FIGS. 2A and 2B is arranged so as to be able to detect an overcurrent of an output in addition to detect the decrease in the output voltage VO. That is, the base voltage of the transistor Q3 can be represented by the following equation.

$$VO \times R2/(R1+R2)=(IO/N)\cdot R4 \quad (2)$$

where R1 to R4 represent resistances of the resistors R1 to R4, respectively; IO, a current flowing in the output transistor Q1; and N, an emitter area ratio between the transistors Q1 and Q2.

Therefore, from equation (2), the following equation can be obtained.

$$VO/IO=\{(R1+R2)/R2\}\cdot R4/N=constant \quad (3)$$

As a result, a change in current IO (overcurrent) can be detected as a change in voltage of the node N2 through a detection line C1*b*.

Note that, in FIG. 1, the output signal from the microcomputer 12 to the decoder 13 is not limited to parallel data shown in the figure, but can be serial data or other signals.

In the system power supply 10 in the above embodiment, in a control operation by the protective circuit 14, the abnormal operation or stop of the entire audio set is prevented. When an abnormality occurs in the power supply circuit 11*a* for the microcomputer, however, if the microcomputer 12 abnormally operates (overruns), the operation of the entire audio set which is erroneously controlled by the microcomputer 12 may be abnormal. The same problem arises in the decoder 13.

Figure 3:
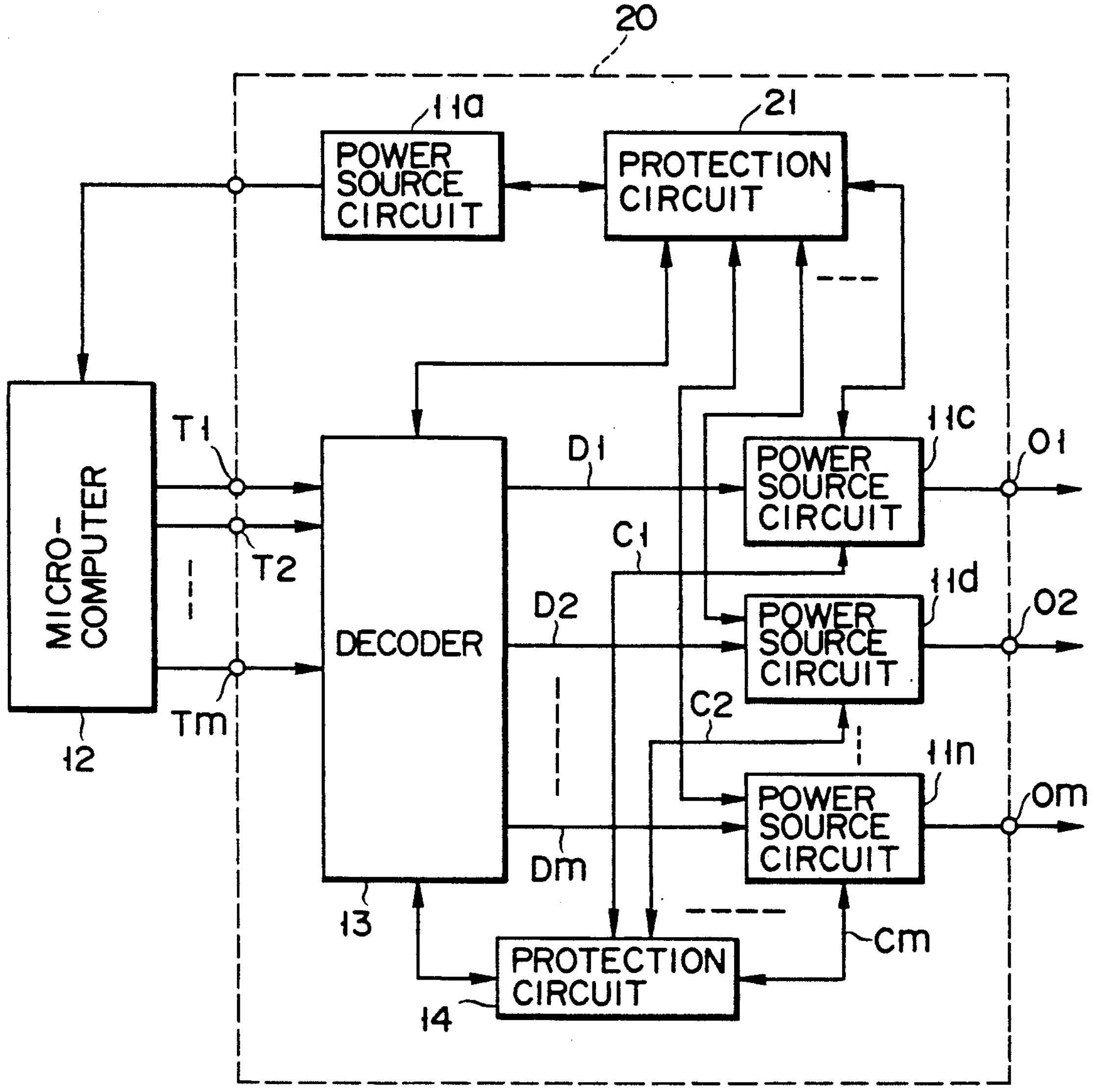
FIG. 3 is a block diagram showing an arrangement of another embodiment of the present invention.

A system power supply 20 according to another embodiment of the present invention for solving this problem is shown in FIG. 3. The system power supply 20 is different from the system power supply 10 of the above embodiment in additionally comprising a protective circuit (such as a current limiter) 21 for detecting an abnormality when the abnormality occurs in the power supply 11*a* for the microcomputer and controlling all the power supply circuits 11*a*, 11*b*, . . . , 11*n* and the decoder 13 in an OFF state. Other parts are essentially the same as in FIG. 1, and the same reference numerals as in FIG. 1 denote the same parts in FIG. 3.

In the above system power supply 20, the same effect as in the above embodiment can be obtained. In addition, when the protective circuit 21 detects an abnormality in the power supply circuit 11*a* for the microcomputer, the protective circuit 21 controls all the power supply circuits and the decoder 13 in an OFF state. Therefore, the power is not supplied to the tuner section, the amplifier section, and a microcomputer 12, so that the microcomputer does not abnormally operate, and the entire audio set does not abnormally operate.

As described above, by the power supply monolithic integrated circuit according to the present invention, in a control operation when the protective circuit detects an abnormality in the circuit section except for the power supply circuit for the microcomputer, the microcomputer can continue to operate, and the electronic equipment controlled by the microcomputer can continue partial operation.

In addition, by the power supply monolithic integrated circuit according to the present invention, if the second protective circuit detects an abnormality in the microcomputer power supply circuit, all the power supply circuits are controlled in an OFF state, so that the power is not supplied to each section of the electronic equipment and the microcomputer. Therefore, the microcomputer does not abnormally operate, and the entire electronic equipment does not abnormally operate either.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A power supply monolithic integrated circuit controlled by a microcomputer external to said monolithic integrated circuit, comprising:

a microcomputer power supply for supplying power to said external microcomputer;

power supplies other than said microcomputer power supply;

decoding means for decoding signals from said external microcomputer and outputting power supply control signals to said power supplies other than said microcomputer power supply; and first protective circuit means for detecting a first abnormality in any one of said power supplies other than said microcomputer power supply, and for controlling said power supplies other than said microcomputer power supply to an OFF state independently of an ON/OFF state of said microcomputer power supply in response to the detected first abnormality.

2. A circuit according to claim 1, further comprising second protective circuit means for detecting a second abnormality in said microcomputer power supply and for controlling said microcomputer power supply and said power supplies other than said microcomputer power supply in an OFF state in response to the detected second abnormality.

3. A circuit according to claim 1, wherein each of said plurality of power supplies comprises detecting means for detecting a change in output voltage, and said first protective circuit means comprises OR means for receiving a detection signal from said detecting means, and means for cutting off an output voltage of a corresponding power supply in response to an output from said OR means.

4. A circuit according to claim 3, wherein said detecting means comprises a comparator for comparing an output voltage with a reference voltage, and means for outputting an output obtained from said comparator in accordance with the change in output voltage as a detection signal to said first protective circuit.

5. A power supply circuit controlled by a microcomputer external to said power circuit, comprising:

a microcomputer power supply for supplying power to said external microcomputer;

power supplies other than said microcomputer power supply;

decoding means for decoding signals from said external microcomputer and outputting power supply control signals to said power supplies other than said microcomputer power supply; and first protective circuit means for detecting a first abnormality in any one of said power supplies other than said microcomputer power supply, and for controlling said power supplies other than said microcomputer power supply to an OFF state independently of an ON/OFF state of said microcomputer power supply in response to the detected first abnormality.

6. A circuit according to claim 5, further comprising second protective circuit means for detecting a second abnormality in said microcomputer power supply and for controlling said microcomputer power supply and said power supplies in an OFF state in response to a detected second abnormality.

7. A circuit according to claim 5, wherein each of said plurality of power supplies comprises detecting means for detecting a change in output voltage, and said first protective circuit means comprises OR means for receiving a detection signal from said detecting means, and means for cutting off an output voltage of a corresponding power supply in response to an output from said OR means.

8. A circuit according to claim 7, wherein said detecting means comprises a comparator for comparing an output voltage with a reference voltage, and means for outputting an output obtained from said comparator in accordance with the change in output voltage as a detection signal to said first protective circuit.

9. A power supply circuit for supplying power to a plurality of external components and which is controlled by a microcomputer external to said power supply circuit, comprising:

a microcomputer power supply for supplying power to said external microcomputer;

component power supplies respectively coupled to said plurality of external components;

decoding means for decoding signals from said external microcomputer and outputting power supply control signals for selectively controlling said component power supplies; and first protective circuit means for detecting a first abnormality in any one of said component power supplies, and for controlling said component power supplies to an OFF state independently of the ON/OFF state of said microcomputer power supply in response to the detected first abnormality.

10. The power supply circuit according to claim 9 further comprising:

second protective circuit means for detecting a second abnormality in said microcomputer power supply and for controlling said component power supplies and said microcomputer power supply to an OFF state in response to the detected second abnormality.

* * * * *